(12) United States Patent
Brenner et al.

(10) Patent No.: US 9,200,468 B2
(45) Date of Patent: Dec. 1, 2015

(54) WIND ENERGY PLANT TOWER

(75) Inventors: Albrecht Brenner, Aurich (DE); Rene Mertens, Oranienburg (DE); Panos Papadopoulos, Aurich (DE); Roy Kersten, Hohen Warthe (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 14/124,927

(22) PCT Filed: Jun. 7, 2012

(86) PCT No.: PCT/EP2012/060834
§ 371 (c)(1),
(2), (4) Date: Mar. 21, 2014

(87) PCT Pub. No.: WO2012/168387
PCT Pub. Date: Dec. 13, 2012

(65) Prior Publication Data
US 2014/0190115 A1  Jul. 10, 2014

(30) Foreign Application Priority Data
Jun. 10, 2011 (DE) .......... 10 2011 077 428

(51) Int. Cl.
*E04H 12/34* (2006.01)
*E04H 12/08* (2006.01)
*F03D 11/04* (2006.01)
*E04H 12/00* (2006.01)

(52) U.S. Cl.
CPC ................ *E04H 12/34* (2013.01); *E04H 12/00* (2013.01); *E04H 12/085* (2013.01); *F03D 11/04* (2013.01); *F05B 2230/232* (2013.01); *F05B 2280/1071* (2013.01); *Y02E 10/728* (2013.01)

(58) Field of Classification Search
CPC ....... E04H 12/34; E04H 12/00; E04H 12/085; F03D 11/04; F05B 2280/1071; F05B 2230/232; Y02E 10/728
USPC ........... 52/651.01, 845, 40, 843–844, 651.04, 52/300–301, 848–849; 405/249, 251; 403/333–334, 335–337
See application file for complete search history.

(56) References Cited

U.S. PATENT DOCUMENTS

| | | | | |
|---|---|---|---|---|
| 1,765,946 A * | 6/1930 | Shea | ............................ | 220/565 |
| 1,937,604 A * | 12/1933 | Taylor | ........................... | 228/154 |
| 2,011,719 A * | 8/1935 | Kidd | ........................ | 219/137 R |
| 2,216,033 A * | 9/1940 | Hopkins | ...................... | 228/189 |
| 2,836,406 A * | 5/1958 | Nutter | ........................ | 261/114.4 |
| 4,225,264 A * | 9/1980 | Coone | ........................... | 403/337 |

(Continued)

FOREIGN PATENT DOCUMENTS

| | | |
|---|---|---|
| CN | 1759242 A | 4/2006 |
| CN | 101970776 A | 2/2011 |

(Continued)

*Primary Examiner* — Jeanette E Chapman
(74) *Attorney, Agent, or Firm* — Seed IP Law Group PLLC

(57) ABSTRACT

There is provided a wind power installation pylon comprising a plurality of pylon segments which respectively have an upper and a lower horizontal flange. At least one of the plurality of the pylon segments has at least two longitudinal flanges. Each longitudinal flange has a first side for bearing against a first side of a further longitudinal flange and a second side to which the peripheral surface is welded, wherein the second side is opposite to the first side.

8 Claims, 3 Drawing Sheets

(56) References Cited

U.S. PATENT DOCUMENTS

| | | | |
|---|---|---|---|
| 6,715,243 B1 * | 4/2004 | Fons | 52/192 |
| 7,621,049 B2 * | 11/2009 | Wobben | 29/897.33 |
| 7,665,273 B2 * | 2/2010 | Fuellhaas et al. | 52/745.04 |
| 7,770,343 B2 | 8/2010 | Montaner Fraguet et al. | |
| 7,802,412 B2 * | 9/2010 | Jensen | 52/651.07 |
| 8,087,898 B2 * | 1/2012 | Tetambe et al. | 416/244 R |
| 8,225,576 B2 * | 7/2012 | Kristensen | 52/741.14 |
| 8,322,757 B2 * | 12/2012 | Ma | 285/416 |
| 8,590,276 B2 * | 11/2013 | Kryger et al. | 52/845 |
| 2007/0294955 A1 * | 12/2007 | Sportel | 52/40 |
| 2008/0313972 A1 * | 12/2008 | Grob et al. | 52/40 |
| 2009/0129853 A1 * | 5/2009 | Pionetti | 403/23 |
| 2010/0117353 A1 * | 5/2010 | Ma | 285/64 |
| 2010/0319276 A1 * | 12/2010 | Kryger et al. | 52/173.1 |
| 2011/0131898 A1 * | 6/2011 | Nies et al. | 52/173.1 |

FOREIGN PATENT DOCUMENTS

| | | |
|---|---|---|
| DE | 101 52 018 A1 | 4/2003 |
| DE | 60 2005 002 760 T2 | 7/2008 |
| DE | 202008006307 U1 * | 9/2009 |
| DE | 102010048547 A1 * | 4/2012 |
| EP | 1 606 514 B1 | 11/2007 |
| EP | 2 006 471 A1 | 12/2008 |
| JP | 4865111 B1 * | 2/2012 |
| WO | 2010/134029 A2 | 11/2010 |

* cited by examiner

– 1 –
WIND ENERGY PLANT TOWER

BACKGROUND

1. Technical Field

The present invention concerns a wind power installation pylon.

2. Description of the Related Art

The pylons of wind power installations are typically made up from pylon segments, the pylon segments typically being prefabricated parts. The segments are typically conical or cylindrical. The pylon segments can be made either from steel or concrete. The higher a pylon of a wind power installation is intended to be, the correspondingly larger is the base surface area of the lower pylon segments. The dimensions of the lower pylon segments however are limited by the transport options.

EP 1 606 514 B1 shows a pylon of a wind power installation having a number of cylindrical or conical pylon portions or pylon segments. The pylon portions or pylon segments can have a respective horizontal flange at the upper and lower ends. In addition thereto vertical flanges can be provided so that a pylon segment can be divided in the longitudinal direction. The vertical flanges are fixed on the inside of a peripheral surface of the pylon portions so that the peripheral surfaces of the pylon portions touch each other at their connecting locations. The vertical flanges are welded onto the inside of the peripheral surface and are displaced with respect to the ends of the peripheral surfaces by a spacing so that spacer elements can be provided between the adjacent vertical flanges.

DE 60 2005 002 760 T2 shows a pylon of a wind power installation. The pylon comprises prefabricated metal wall parts which each have two longitudinal flanges.

DE 101 52 018 A1 shows a pylon of a wind power installation comprising a plurality of segments, wherein the segments each have at least one horizontally oriented flange.

WO 2010/134029 A1 shows a pylon of a wind power installation, having a plurality of segments, wherein the segments each have at least two longitudinal flanges.

U.S. Pat. No. 7,770,343 B2 shows a pylon of a wind power installation, which can be made up from a plurality of segments, the segments each having longitudinal flanges.

BRIEF SUMMARY

One or more embodiments of the present invention are directed to a pylon of a wind power installation, which has improved statics even when the pylons are very high.

In one embodiment there is provided a wind power installation pylon which is constructed from a plurality of pylon segments which respectively have an upper and a lower horizontal flange. At least one of the segments has at least two longitudinal flanges (which are oriented vertically). Each of the longitudinal flanges has a first contact surface which is in contact with a contact surface of another longitudinal flange. The peripheral portions of the pylon segments are welded onto the second contact surface of the longitudinal flanges, that is opposite to the first one. Accordingly the ends of the peripheral portions of the pylon segments do not touch each other but they are coupled together by way of the longitudinal and vertical flanges respectively.

That is advantageous as the longitudinal flanges can be manufactured separately from the peripheral portions, with a very high level of accuracy, so that two longitudinal flanges can be fixed to each other with very good fitting accuracy. That is in turn advantageous in regard to the statics of the entire pylon. According to one embodiment of the invention, the longitudinal flanges and the peripheral portions of the pylon segments are not produced in one piece but separately from each other. It is only then that the peripheral portions can be welded to the second contact surfaces of the longitudinal flanges.

In an aspect of the invention the longitudinal flanges have a third side which is visible outwardly.

In an aspect there is provided a groove in one of the longitudinal flanges. The longitudinal flanges can be fixed to each other for example by means of screws.

In an aspect of the invention the peripheral portion is substantially flush with the third side.

Further configurations of the invention are subject-matter of the appendant claims.

BRIEF DESCRIPTION OF THE SEVERAL VIEWS OF THE DRAWINGS

Advantages and embodiments by way of example of the invention are described in greater detail hereinafter with reference to the drawing.

DETAILED DESCRIPTION

Figure 1:
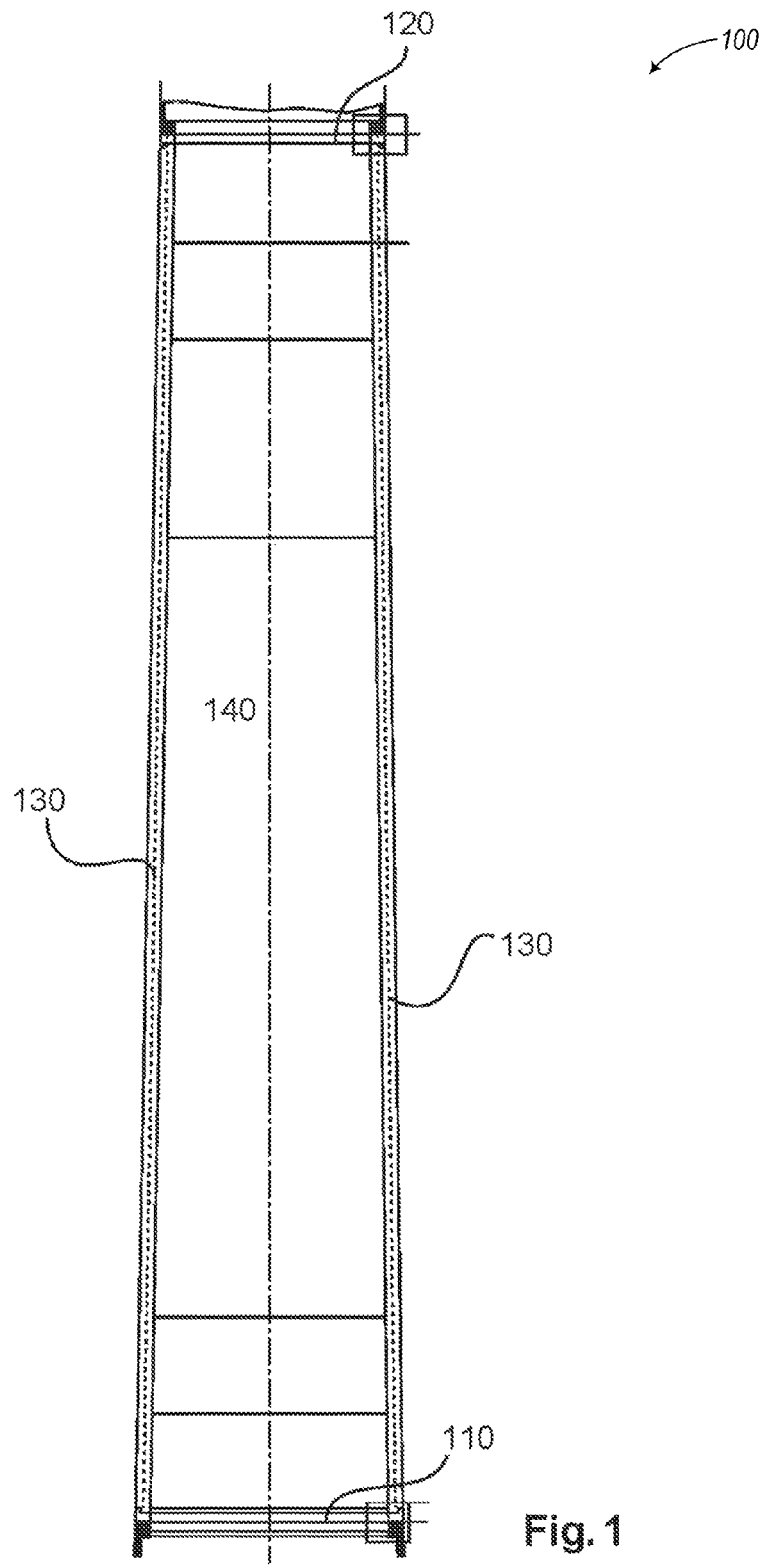
FIG. 1 shows a sectional view of a pylon segment of a wind power installation pylon according to a first embodiment.
Figure 6:
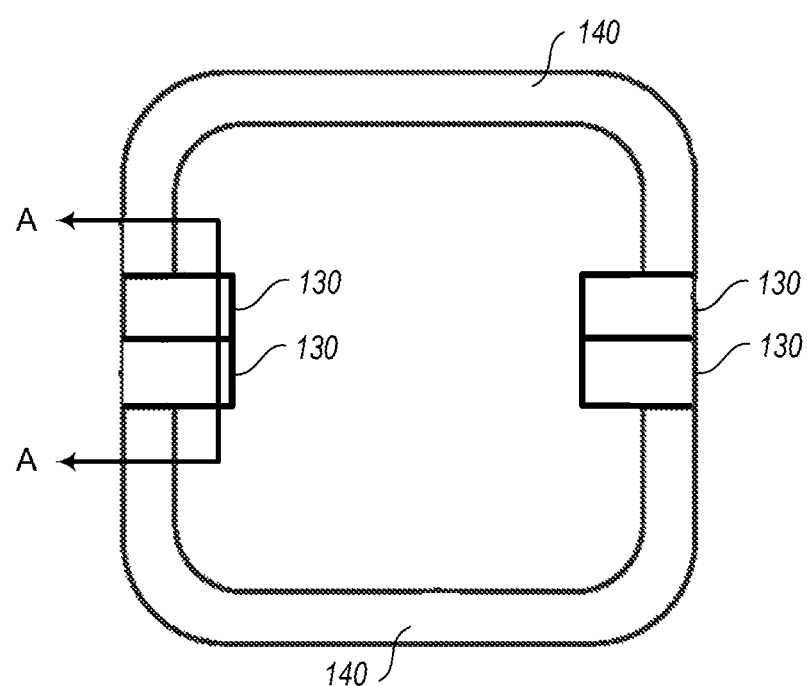
FIG. 6 shows a top cross sectional view of a pylon segment according to the first embodiment.

FIG. 1 shows a sectional view through a pylon segment 100 of a wind power installation pylon according to a first embodiment. The pylon can comprise a multiplicity of pylon segments 100 which are stacked or arranged one upon the other. The pylon segment 100 has a lower horizontal flange 110, an upper horizontal flange 120, two longitudinal flanges 130 and a peripheral portion 140 which extends between the upper and lower flanges 120, 110 and the two longitudinal flanges 130. The pylon segment can thus consist of two halves which have respective longitudinal flanges 130 as shown in FIG. 6. By means of the longitudinal flanges 130, the one half of the pylon segment 100 can be fixed to the other half of the pylon segment with corresponding longitudinal flanges 130. The upper and lower flanges 120, 110 serve for fixing further pylon segments to construct a pylon of a wind power installation. The pylon segment can also be divided into more than two parts.

According to one embodiment of the invention the longitudinal flanges 130 are produced separately from the portion 140.

Figure 2:
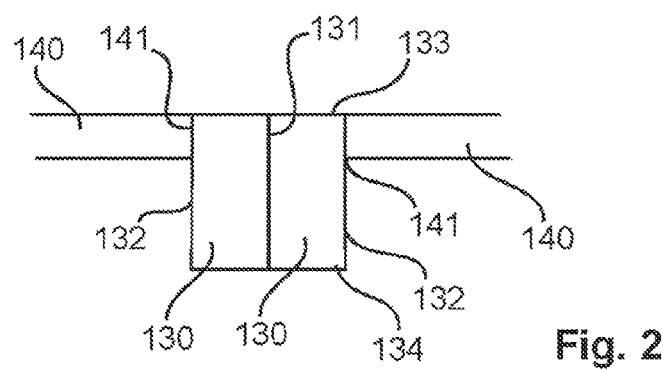
FIG. 2 shows a diagrammatic cross-section through the pylon segment in the region of the longitudinal flanges according to a first embodiment.

FIG. 2 shows a diagrammatic cross-section of the pylon segment along line A-A of FIG. 6 in the region of the longitudinal flanges according to a first embodiment. FIG. 2 shows two longitudinal flanges 130. The longitudinal flanges have a first (inner) side (a first contact side) 131, a second (outer) side (second contact side opposite the first side) 132, a third (outwardly directed) side 133 and a fourth (inwardly directed) side 134. Two longitudinal flanges 130 respectively bear upon or against each other with their first sides 131 and can be for example screwed together. The peripheral portions 140 are fixed (for example welded) with their first end 141 to the second contact side 132 of the flange. Thus the first contact sides 131 of the longitudinal flanges 130 are in contact with each other while the peripheral portions 140 are fixed, for example welded, with their first ends 141 to the second contact side 132. The separate manufacture of the longitudinal flanges 130 and the peripheral portions is particularly advantageous because the longitudinal flanges 130 can be very accurately produced in the form of a straight component. Accordingly it is possible to provide very accurate contact surfaces (i.e. flat contact surfaces) (first side 131) so that the longitudinal flanges can be very well fixed to each other with their first sides.

Figure 3:
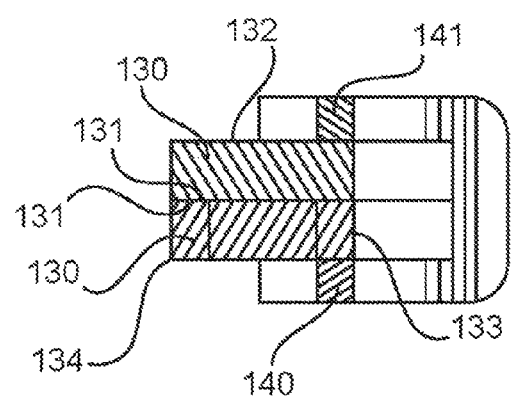
FIG. 3 shows a diagrammatic sectional view through a portion of the pylon segment according to the first embodiment.

FIG. 3 shows a diagrammatic sectional view through a portion of the pylon segment according to the first embodiment. Each longitudinal flange 130 has a first side 131, a second side 132, a third side 133 and a fourth side 134. The first sides 131 can be produced very accurately. At the second sides 132 (opposite the first side) the peripheral portions can be fixed (for example welded) to the flange 130. The flanges can be fixed to each other for example by means of a screw connection.

If two portions of a longitudinally divided pylon segment are fixed to each other by means of the longitudinal flanges 130 then the two longitudinal flanges 130 and the weld locations to the peripheral portions 140 can be seen from the outside as the flanges 130 extend to the exterior, that is to say the third sides 133 of the flanges 130 are visible from the exterior.

Figure 4:
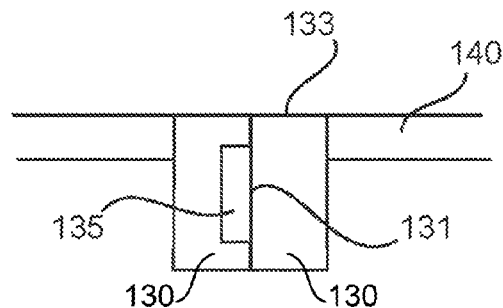
FIG. 4 shows a diagrammatic sectional view through a portion of a pylon segment according to a second embodiment.

FIG. 4 shows a diagrammatic sectional view through a portion of a pylon segment according to a second embodiment which can be based on the first embodiment. One of the two flanges 130 can have a groove 135 at its first side 131. In addition there can be through holes (not shown) at the two longitudinal flanges 130 so that the flanges can be fixed together by means of screw connections. The groove 135 can be for example of a depth of 1 to 10 mm. Preferably the depth, width and height of the groove are such that an equilibrium is achieved between the force produced by the screw connections and the force produced by the wind.

Figure 5:
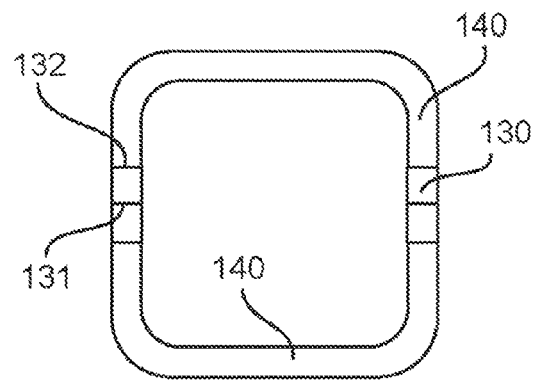
FIG. 5 shows a diagrammatic sectional view through a pylon according to a third embodiment.

FIG. 5 shows a diagrammatic sectional view through a pylon according to a third embodiment which can be based on the first or second embodiment. FIG. 5 shows a cross-section through a pylon segment with two pylon portions each having a peripheral portion 140 and two longitudinal flanges 130, wherein both the third sides 133 of the longitudinal flanges and also the weld seams between longitudinal flange 130 and peripheral portion 140 are visible from the exterior.

The pylon according to one embodiment of the invention is optionally made from steel, that is to say the pylon segments comprise steel.

The various embodiments described above can be combined to provide further embodiments. All of the U.S. patents, U.S. patent application publications, U.S. patent application, foreign patents, foreign patent application and non-patent publications referred to in this specification and/or listed in the Application Data Sheet are incorporated herein by reference, in their entirety. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A wind power installation pylon comprising:
   a plurality of pylon segments, each having an upper and a lower horizontal flange and a peripheral portion that includes longitudinal sides,
   a plurality of first and second longitudinal flanges, wherein each of the first and second longitudinal flanges have first and second sides that are opposite each other, and third and fourth sides that are opposite each other, and
   welding joints, wherein the second sides of the longitudinal flanges are coupled to the longitudinal sides of the pylon segments by the welding joints,
   wherein respectively, two of the first sides of the longitudinal flanges bear against each other and are coupled together to form pairs.

2. The wind power installation pylon according to claim 1 wherein the third side of the first and second longitudinal flanges are visible at an exterior of the wind power installation pylon.

3. The wind power installation pylon according to claim 1 wherein the first side of one of the longitudinal flanges of a pair has a groove, wherein the pairs of longitudinal flanges are coupled to each other by fasteners that extend through a plurality of through holes in the first and second longitudinal flanges.

4. The wind power installation pylon according to claim 2 wherein a surface of the peripheral portion is substantially flush with a surface of the third side of the longitudinal flanges.

5. A process for making a wind power installation pylon that includes a plurality of pylon segments, wherein a pylon segment has an upper and a lower horizontal flange, a peripheral portion and at least two longitudinal flanges, wherein the longitudinal flange has a first side and a second side opposite to the first side, the method comprising:
   forming a plurality of longitudinal flanges;
   welding the second side of the longitudinal flanges to the peripheral portions; and
   coupling two longitudinal flanges together.

6. The process of claim 5 wherein coupling two longitudinal flanges together comprises using a fastener to couple the two longitudinal flanges together.

7. The process of claim 5 wherein coupling two longitudinal flanges together comprises coupling two longitudinal flanges together at respective first sides.

8. The wind power installation pylon of claim 1 wherein the third side of the first and second longitudinal flanges are flush with an exterior surface of the respectively coupled pylon segment.

* * * * *